May 26, 1970   G. J. BRENNAN   3,514,342
METHOD OF MAKING A BATTERY
Filed May 2, 1968   3 Sheets-Sheet 2

May 26, 1970  G. J. BRENNAN  3,514,342
METHOD OF MAKING A BATTERY
Filed May 2, 1968  3 Sheets-Sheet 3

United States Patent Office 3,514,342
Patented May 26, 1970

3,514,342
METHOD OF MAKING A BATTERY
George J. Brennan, Blackwood, N.J., assignor to ESB Incorporated, a corporation of Delaware
Filed May 2, 1968, Ser. No. 726,069
Int. Cl. H01m 35/18
U.S. Cl. 136—176
10 Claims

ABSTRACT OF THE DISCLOSURE

A battery has a container consisting of a first side portion and a second side portion sealed together in any convenient manner. The cover may be separate from, or integrally constructed with, the two side portions of the container. Single cell or multicell as well as primary or secondary batteries may be so constructed.

In multicell batteries the intercell strap connectors extend through the partitions of the cell compartments, preferably as molded inserts in the partitions. Preferably the ends of the intercell strap connectors are anchored by the container. Strap connectors may extend from end cells through the container as inserts molded therein to function as terminals.

Cross reference to related application

This invention is related to one being filed concurrently with this application entitled "Battery Having Container in Two Portions and a Method for Making It," application No. 726,068 in which Frederick J. Port is the inventor.

Background of the invention

The background of this invention will be discussed in terms of the multicell lead-acid automotive battery.

In the automotive battery industry the word "stack" is used to include a collection of alternatively spaced positive and negative electrode. The "stack" could include only one positive and one negative electrode, but typically several electrodes of each polarity are included and it is common practice in the automotive battery industry for there to be one more negative electrode than positive electrode. These electrodes are frequently referred to as "plates," perhaps because of their thin, flat, plate-like configuration. Where the electrodes are to be placed closely together it is customary to include insulating separators between adjacent electrodes as components in the stack to prevent adjacent electrodes from discharging against each other, but if the electrodes are to be spaced far apart or if some other means to prevent self-discharge can be devised then these separators are not essential components of the stack. Separators are common components of the stacks used in automotive batteries. The term "stack" does not include the straps which are subsequently added to connect the electrodes of like polarity together mechanically and electrically. After the positive electrodes have been electrically connected together by a positive electrode connecting strap and the negative eletrodes have been electrically connected together by a negative electrode connecting strap the word "element" is applied to the combination of stack and connecting straps. In multicell batteries these elements are electrically connected together in series. There are therefore essentially two problems involved: First, strap connectors have to be added to stacks to create elements and second, the elements have to be electrically connected in series.

There are essentially two alternatives by which strap connectors can be applied to the stacks. In the first the stacks are placed in the container and the strap connectors applied there. With this alternative the container serves as a fixture or jig which holds the stack together while the strap connectors are added. The advantage of this approach is that no separate fixture is required but, where heat is applied to join the strap connectors to the electrodes, the disadvantages include the difficulty in confining the molten metal as well as the possibility that the heat might damage the container or separators. The second alternative, which overcomes the disadvantages of the first, is to add the strap connectors to the stacks outside the container in an element assembly machine and then place the resulting elements in the individual cell compartments of the container. The disadvantages of the second alternative are that the element assembly machines involved are expensive, and the two steps of placing the stacks into the machines and removing the elements from them are in addition to the necessary subsequent step of placing the elements in cell compartments of the containers; except that they permit the connecting straps to be added to the stacks while easily confining the molten metal and without damage to the container, these two steps are essentially unnecessary, for otherwise they contribute nothing to the final product. Use of the element assembly machines is customary throughout the automotive battery industry in the United States today.

The second problem involves the fact that the elements must be connected together in series. Until recent years the strap connectors of an element in one cell compartment did not extend over or through the partition to connect with the element in the adjacent cell compartment and this was true regardless of whether the strap connectors were applied to the stacks inside or outside of the container. Thus it was necessary to devise some way of constructing intercell connectors inside the container after the elements had been placed in the cell compartments. Several such methods are shown in the following recently issued U.S. Pats. 3,275,793; 3,313,658; and 3,336,164. Regardless of how this work was done, there were several problems which were inherently involved. For one, the construction of the intercell connectors was a separate step necessarily following the construction of the strap connectors. Also there was a possibility of a poor electrical connection between components of the intercell connectors or between the intercell connector and the strap connectors. Finally there was the possibility that electrolyte might leak between the cells through the hole or slot in the partition which was necessarily involved and that discharge of one cell against another might subsequently result.

In recent years techniques have been devised by which to combine the solutions of these two problems. In general, these techniques show the positive electrode strap connector for electrodes in the element in one cell compartment extending through or over the partition to serve as the negative electrode strap connector in the element in the adjacent cell compartment. This extending strap connector thus served an additional function, that of an intercell connector, and therefore might be referred to with the descriptive phrase "intercell strap connector." Just as the strap connector for elements in individual cell compartments could be applied outside or inside the container, so also can the intercell strap connectors. Both methods of constructing intercell strap connectors are illustrated in recently issued U.S. pats. In U.S. Pat. 3,350,237 the stacks are first placed in the container and subsequently the intercell strap connector is added. The protection of the container from damage by the heat used to construct the intercell strap connector is one of the problems with which this patent is concerned. In U.S. Pats. 3,253,962 and 3,309,232 the intercell strap connectors are applied outside the container and an assembly of six electrically connected elements is subsequently dropped into the container. With either of these two construction methods a necessary condition is that there be a slot in either the partition or the cover into which the intercell strap connector may be fitted. One of the earliest constructions in which a slot was provided in the partition to receive the intercell strap connector is shown in U.S. Pat. 2,828,349 (that pat. does not expressly state whether the intercell strap connector is applied to the stacks inside or outside the container). When the intercell strap connector is fitted into a partition slot the remaining unfilled portion must be filled to prevent intercell leakage of electrolyte either by the use of some kind of insert (see U.S. Pat. 3,253,962) or by a portion of the cover which projects downward to fill the slot (see U.S. Pat. 3,309,232). Insertion of a separate insert is avoided where the slot is in the cover (see U.S. Pat. 3,350,237) but in all three pats. a separate cementing step is required where the intercell strap connector extends through the partition. In addition to requiring a separate step and equipment to perform it, this cementing increases the risk of unsatisfactory construction. The use of these intercell strap connectors has two primary advantages; the separate step required to construct intercell connectors after strap connectors are constructed is eliminated, and the resulting intercell strap connector usually goes through the partition in a straight path rather than jogging upward in the shape of an inverted U. This latter advantage results in a minimum electrical path or internal resistance and also produces a savings in materials. A disadvantage in the use of these intercell strap connectors is that there is always a slot in the partition or cover which must be filled, requiring extra effort and care. Where the intercell strap connectors are applied to the stacks outside the containers there still is the requirement of expensive machinery which holds the stacks together and constructs the intercell strap connectors, along with the two steps of placing stacks into those machines and removing elements from them before the elements are placed into the container.

Finally, British pat. specification 988,423 describes two alternative constructions which should be reviewed briefly. In the preferred construction the stacks are first placed into cell compartments, the lugs of the electrodes being held in slots in a baffle of heat and acid resistant material. The intercell strap connectors are then placed in the container, where they fit through slots in the partition, and are connected to the electrodes. The preferred embodiment is thus remindful of U.S. Pat. 3,350,237. As an alternative to the preferred construction, British Pat. 988,423 states that the intercell strap connectors may be integrally molded with the partitions, a construction which requires that the electrode width be less than the width of the interior of the container so that the electrodes may be inserted between the intercell strap connectors.

Summary of the invention

This summary will describe the invention as it concerns multicell storage batteries until otherwise indicated.

With this invention the container is constructed in two portions, a first side portion and a second side portion. The intercell strap connectors extend through the partitions in one or both portions of the container. It is highly desirable that the intercell strap connectors be inserts around which the partitions of the container are molded.

A number of advantages result from having the container constructed in two portions and from having the intercell strap connectors extend through the partitions of the container. First, the two previously separate steps—connection of straps to the plates in stacks and the subsequent construction of an intercell connector joining connecting straps of unlike polarity in adjacent cells—are combined into a single step, and the equipment previously needed to construct separate intercell connectors is thus eliminated. Second, the container may serve as a fixture or jig for the stack until and while the strap connectors are connected to the plates in the stack, thus eliminating the need for the expensive element assembly machines which have served this function in prior construction. Third, the two previous steps of placing stacks in an element assembly machine and subsequently removing them, both of which were performed before the elements were placed in the container, are entirely eliminated. Fourth, the step of cementing a partition or cover slot, which step was previously required where intercell strap connectors extended through slots in the partitions of the container or cover (see U.S. Pats. 3,253,962; 3,309,232; and 3,350,237) is completely eliminated if the intercell strap connector is molded as an insert in the partition of the container, as is the attendant hazard that the filler piece might not produce a liquid-tight seal in the slot. Fifth, the intercell strap connectors may extend in a straight line through the partitions in the upper portions of the container (such as is shown in U.S. Pats. 3,253,962; 3,309,232; and 3,350,237) rather than jogging upward in the shape of an inverted U (such as is shown in U.S. Pats. 3,275,793; 3,313,658; and 3,336,164), resulting in a minimum internal electrical resistance and reducing the quantity of materials required to a minimum. Finally, rather than having a single piece container which requires the stack to be inserted into the container from above the molded insert intercell strap connector as does the British Pat. 988,423, this invention permits the stack to be inserted sideways into one or both portions of the container; with this invention the molded insert intercell strap connectors need not be placed at the ends of the cell compartments and the electrodes may be nearly as wide as the cell compartment is long.

If the intercell strap connectors are inserts around the middle of which the partitions are molded, the ends of the intercell strap connectors may also be molded into other partitions so that the ends of the intercell strap connectors are anchored by the container. Thus anchored the intercell strap connectors increase the vibration resistance of the final product.

The intercell strap connectors also serve as stiffeners along the length of the battery, increasing the rigidity of the battery. This feature is especially useful when the cell compartments are vacuum filled with electrolyte, for the vacuum tends to collapse the container and prevent filling. This is partcicularly true if the container is made from such flexible materials as polypropylene, where economical and thin sections may be produced with sufficient strength to withstand normal battery usage but which may tend to collapse easily when being vacuum filled.

The cover may be separate from, or integrally constructed with, the side portions of the container. Where the cover is integrally constructed with the side portions of the container, access must be provided so that the strap connectors may be connected to the electrodes in the stacks.

The end cell strap connectors may be molded through the exterior wall of the container to function as terminals for the battery. In prior methods of construction the terminal posts were either integrally molded with a strap connector or subsequently added to the strap connector, but in either event the terminal then had to be extended to the exterior of the cover or the container; that step is eliminated by this feature of the invention, as is the need for equipment to perform the step. The internal electrical resistance and the quantity of materials required are also minimized. If the cover is integrally constructed with the side portions of the container, a terminal integrally constructed with a strap connector in each end cell may extend upward and be molded into the cover, again eliminating the previous separate step of extending the terminal to the exterior of the cover.

While the discussion above relates to multicell batteries, most of it is also applicable to single cell batteries except that in that case the strap connectors used are not of the intercell type but are like the end cell strap connectors used in multicell batteries. Although the discussion thus far has concerned automotive batteries which are rechargeable (secondary or storage), the invention is equally applicable to non-rechargeable (primary) batteries.

Regardless of whether the methods of this invention are used with multicell or single cell batteries, certain features apply. Although the two side portions of the container must ultimately be sealed together, the invention is essentially independent of specific sealing techniques, specific materials for the container and cover, and the location of the joint between the two side portions of the container. Any technique which provides a sataisfactory seal between the two portions of the container, and between the container and the cover if the cover is separately constructed, may be used; such specific techniques as sealing with heat, resin cements, and ultrasonics, to name a few, might be used. Likewise the method of this invention is independent of specific materials used to construct the container and cover; materials may be selected on the basis of cost of raw materials, ease of molding, ease of sealing, and other factors, and the two portions of the container may be of different materials if that is advantageous. Both thermoplastic and thermosetting materials may be used. (It is recognized that sealing techniques are not completely independent of the materials to be sealed, and that when one of these variables is fixed the alternatives left to the other may become restricted. For instance, if polyethylenes or polypropylenes are used, heat sealing would probably be the preferred sealing technique. With polystyrene or styrene acrylonitrile, ultrasonics would probably be selected for sealing, while the use of cements would probably provide the best sealing for polyvinylchloride, or acrylonitrile butadiene styrene. The point to be made, however, is that while the choice of materials to be sealed is interrelated with the choice of sealing techniques, this invention is not limited to either specific materials or specific sealing techniques or combinations thereof.) While it may be desirable from the point of view of sealing the two side portions of the container together to have the joint between them located near one end of the container partition, the method is essentially independent of the location of the joint. The method of this invention does require a liquid tight seal between the two portions of the container. The method is also essentially independent of the technique used to connect the electrodes with the connecting straps; in addition to burning which is presently conventional in the automotive battery industry, such other techniques as bolting, crimping, or induction welding, to name several, might be used. Where heat is used, caution must be observed so that the molten metal which joins the strap connectors and electrodes does not flow errantly onto the electrodes or separators. Also, some care may be necessary so that the container is not damaged while the electrodes in the stacks are being joined to the strap connectors, but this problem can be solved by the use of techniques such as that shown in U.S. Pat. 3,350,237 and British Pat. 988,423 (slotted heat protectors are placed over the lugs of the electrodes) or by other methods.

Another advantage of the method is that, to some extent, the steps in the method may be performed in many different sequences. For instance, where the two portions of the container must be sealed together, the electrodes connected to the strap connectors, a cover applied, and terminals added, these steps may be performed in many different sequences, some of which may be preferred to others. Such a degree of freedom is important when laying out manufacturing plants.

While not an essential part of this invention, the battery may be improved by including slots in the strap connectors to receive the lugs from the electrodes and by having the slots extend to the edge of the strap connectors. Since it is common in the automotive battery industry to include one more negative electrode than positive electrode in each stack, each intercell strap connector could have, for instance, 6 slots in its positive end and 7 slots in its negative end, thus assuring an anti-cell reversal feature which would prevent a stack from being placed into a cell compartment backwards. In previous constructions additional metal and/or additional container material was required to obtain an anti-cell reversal feature in individual cell compartments, but here this advantage is achieved merely by the use of different numbers of slots in the two ends of the intercell strap connectors.

Description of the preferred embodiments

The preferred embodiments of the invention will first be discussed as they concern a multicell battery, and subsequently a single cell battery which embodies the invention will be described.

Figure 1:
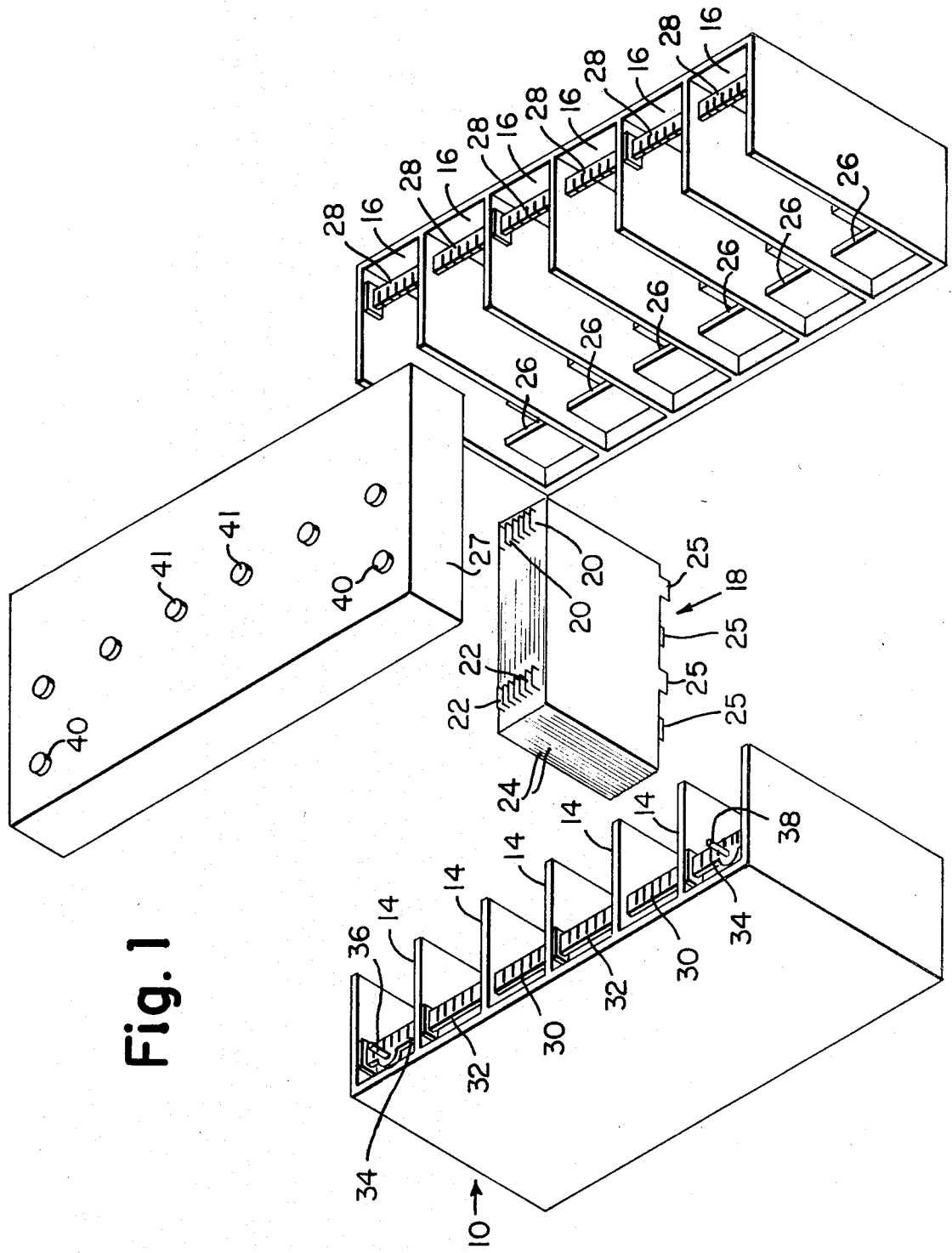
FIG. 1 is an exploded view of a six cell battery made according to the present invention. The container consists of two side portions. Intercell strap connectors extend through the partitions, the partitions having been molded around the intercell strap connectors. A cover is shown separate from the portions of the container. Terminals project upward from strap connectors in the end cells to extend to the exterior of the cover. A stack for insertion into one of the cell compartments of the container is also shown.
Figure 2:
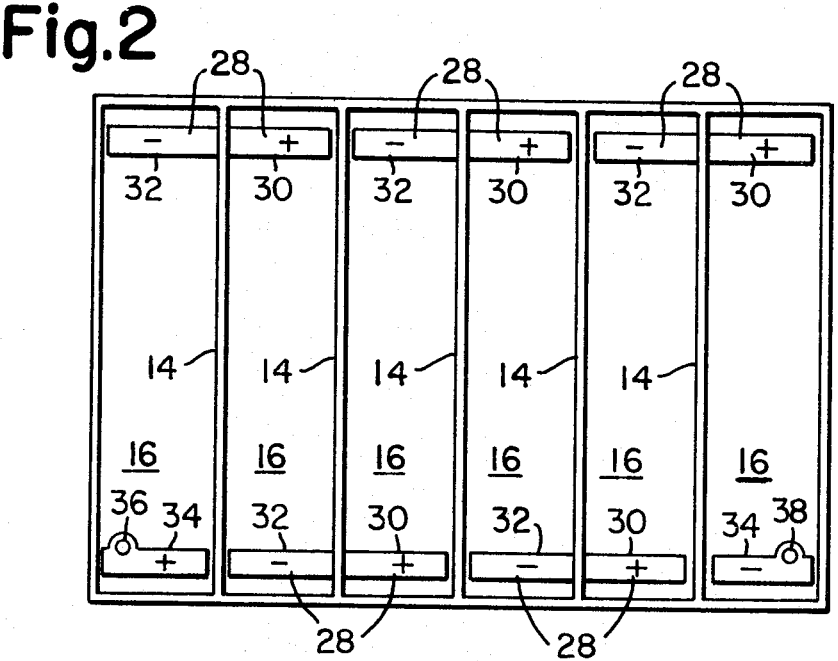
FIG. 2 is a schematic top view of a coverless container after the two portions have been sealed together. The stacks are not shown in the cell compartments. The figure shows five intercell strap connectors and two end cell strap connectors in a six cell battery.
Figure 3:
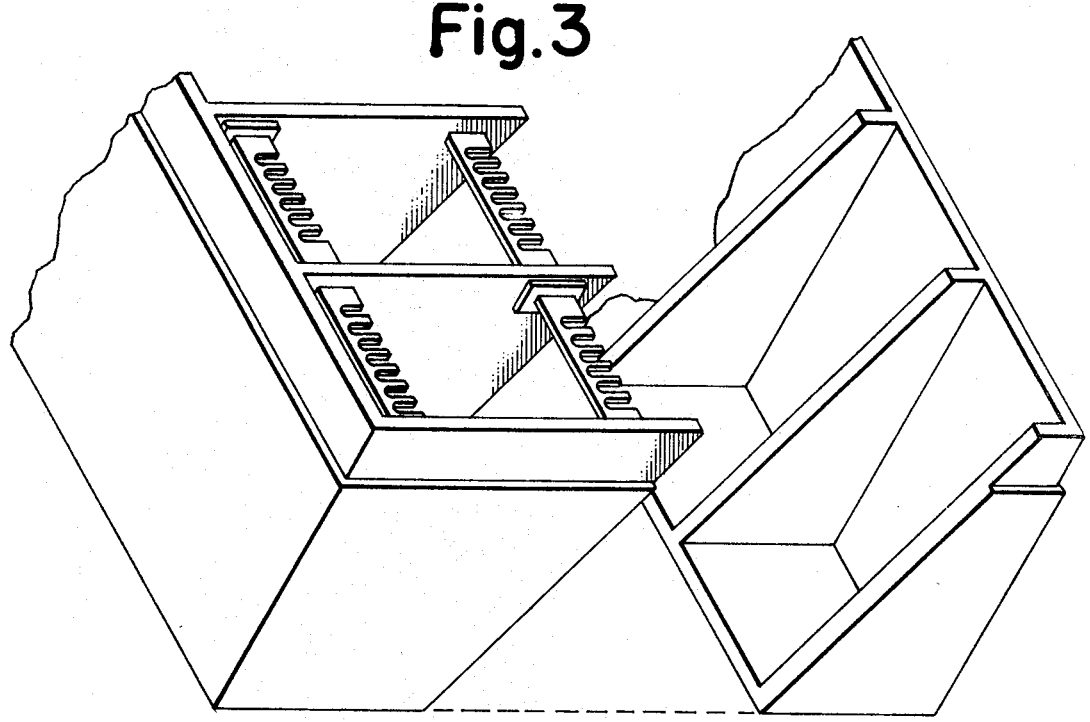
FIG. 3 shows the joint dividing the container into the two side portions being at an angle and away from the center of the container. All of the strap connectors are in the larger side portion of the container.

Discussion of multicell batteries may begin by referring to the construction shown in FIGS. 1 and 2, with subsequent figures showing alternative constructions. As shown in FIG. 1, the container is divided into a first side portion 10 and a second side portion 12. One or both portions have partitions 14 which divide the interior space into cell compartments 16. Into each cell compartment 16 is placed a stack 18 including alternately spaced positive electrodes 20 and negative electrodes 22. The stack shown in FIG. 1 also includes separators 24 between adjacent electrodes. The stack 18 shown in FIG. 1 is typical of many of those presently used in automotive batteries, having 7 negative electrodes and 6 positives. Each electrode is conveniently provided with a pair of feet 25 which are supported by rests 26 in the lower portion of the container. The stacks may be placed initially into either portion of the container. FIG. 1 also shows a cover 27 separately constructed from the container. The drawings show electrodes typical of those presently used in automotive batteries, and so the electrodes appear as flat, thin, rectangular, plate-like objects; these characteristics are not essential requirements of the electrodes, however, either in automotive batteries or in batteries for other purposes, and the electrodes with which this invention is concerned could also be round, thick, or tubular in configuration. The electrodes likewise do not require feet 25, these being shown only because they are conventional in automotive batteries.

As FIGS. 1 and 2 show, the battery also has two types of strap connectors to which the electrodes in the stacks are connected. The first is an intercell strap connector 28 which extends through the partitions 14 of the container and has a positive end 30 in one cell compartment 16 and a negative end 32 in the adjacent cell compartment. Preferably the intercell strap connectors 28 are inserts around which the partitions 14 are molded; alternatively, the intercell strap connectors could be dropped into slots in the partitions and the slots subsequently sealed shut, but at the expense of additional steps and possibly less reliable reults. The other type of strap connector, to be referred to as an end cell strap connector 34, occurs only in the two end cell compartments; in one end cell compartment the strap connector 34 is connected to the positive electrodes in the stack in that compartment, while the strap connector 34 in the other cell compartment is connected to the negative electrodes.

FIGS. 1 and 2 also show positive and negative terminal risers 36 and 38 respectively projecting upward from a strap connector in each of the end cells. The terminal risers, which may be cast integrally with the strap connectors or subsequently added to them, extend to the exterior of the cover and may pass through and possibly be joined with appropriate inserts or bushings 40 situated in the cover. The cover also has vent plug openings 41. The terminals 36 and 38 are shown in the drawings as round, cylindrical, post-like objects. This invention is in no way confined to specific sizes or shapes of terminals.

From the description given thus far, the steps in the construction of the battery shown in FIGS. 1 and 2 may be easily understood. Briefly, the steps are: placing stacks including alternately spaced positive and negative electrodes in each cell-compartment of one portion of the container; sealing the two portions of the container together; connecting the positive electrodes of the stack in one cell compartment to one end of one intercell strap connector; connecting the negative electrodes of the stack in the adjacent cell compartment to the other end of that intercell strap connector; repeating these last two steps until both ends of all intercell strap connectors are connected to electrodes; connecting the positive electrodes of the stack in one end cell compartment to an end cell strap connector in that compartment; connecting the negative electrodes of the stack in the other end cell compartment to an end cell strap connector in that compartment; sealing a cover onto the container; extending a terminal from the positive end cell strap connector in one end cell compartment to the exterior of the cover; and extending a second terminal from the negative end cell strap connector in the other end cell compartment to the exterior of the cover. The steps need not be performed in the exact sequence just stated.

Figure 7:
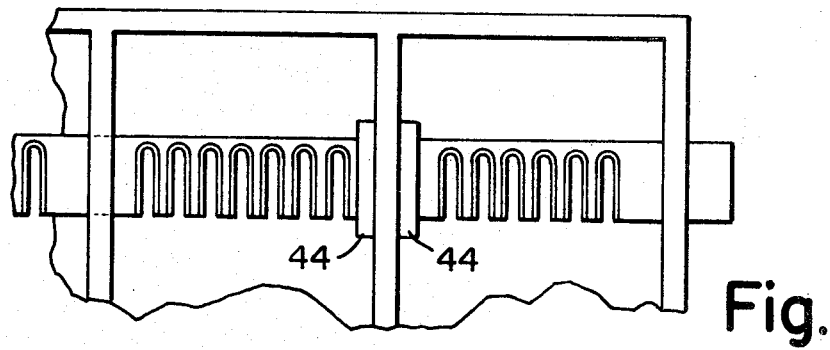
FIG. 7 is a top view of part of the container showing an end cell strap connector extending through the end of the container to function as a terminal. The strap connectors have slots which extend to the edges of the strap connectors. The ends of the strap connectors are anchored as shown on FIG. 5.

Rather than being near the middle of the container as shown in FIG. 1, the joint which divides the container into the two side portions may be very close to one end of the partitions with the result that all of the strap connectors, both intercell and end cell, are in the larger of the two side portions of the container. Having the joint near the end of the partitions in this manner may be advantageous with certain sealing techniques. Where a vertical slice is made in this manner, one construction which would permit the electrodes to be placed into larger side portion of the container would find the strap connectors nearer the joint being elevated above the strap connectors more remote from the joint; this would permit the lugs which are to be connected with the more remote strap connectors to move sideways underneath the nearer strap connectors. The disadvantage of that particular construction is that the lugs on the electrodes to be connected to the more remote strap connectors would have to be shorter than the lugs on the electrodes to be connected to the nearer strap connectors, i.e., in one cell compartment the positive electrodes would have shorter lugs than the negative electrodes while in the adjacent cell compartment the reverse would be true. An alternative construction which permits all of the strap connectors to be in the larger side portion but still be all at one vertical level is shown in FIG. 7, where the joint is on an angle. With that construction the electrodes may first be raised vertically into the larger side portion so that the lugs on the electrodes to be connected to the more remote strap connectors enter the larger side portion between the nearer and more remote strap connectors, following which the electrodes may be moved sideways to connect with the strap connectors; that construction permits all electrodes to have lugs of the same height.

As an alternative to the methods just described, the terminals might be extended to the exterior of the container rather than to the exterior of the cover. An obvious combination of these two alternatives, also within this invention, is to extend one terminal to the exterior of the cover and to extend the other terminual to the exterior of the container.

Figure 4:
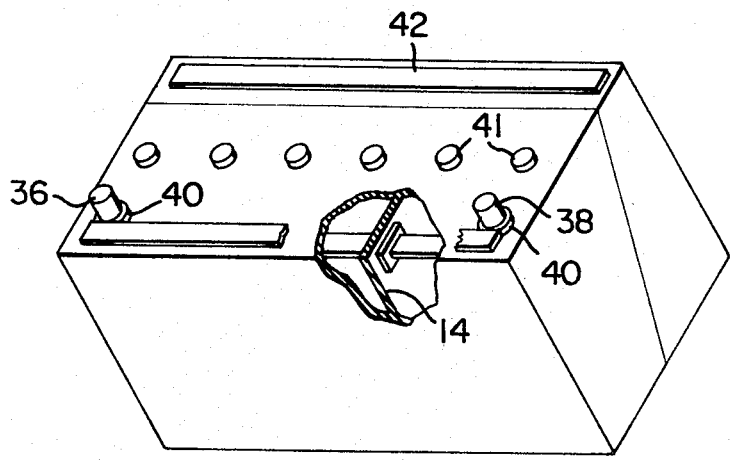
FIG. 4 is an oblique view showing the cover integrally constructed with the two portions of the container. The cover is also in two portions. A fragment of the cover has been removed to show the intercell strap connector extending through the partition.

Another variation of the invention is illustrated in FIG. 4, where the cover is shown integrally constructed with the two portions of the container. (In such an instance the distinction or dividing line between the cover and the container becomes difficult to define. For convenience, the object will be referred to simply as a covered side portion of the container. Regardless of the terminology used to described this object, the intercell strap connectors extend through the partitions as can be seen in FIG. 4 where a fragment of this object has been removed.) Since the electrodes cannot be connected to the strap connectors until they are placed in one or both of the side portions which contain the strap connectors, some means must be provided to permit access to the electrodes and straps afterward. For this purpose the top surface of the covered side of the container is shown being provided with a pair of portals 42 which may be closed or sealed after the electrodes and connector straps are connected. The construction steps with this alternative method are much the same as in the earlier method, except that a separate cover is not sealed onto the container and the terminals may be described simply as extending to the exterior of the covered container rather than specifically extending to the exterior of the container or the cover.

As another alternative construction, the first side portion 10 of the container shown in FIG. 1 may be modified by having the end cell strap connectors extend from the end cell compartments to the exterior of the container. This could be done easily by lengthening the strap connector and molding the outside container wall around it. As a related but still different alternative, where the combined cover and side portion of the container shown in FIG. 4 is used, a strap connector may extend to any desired point on the exterior of the covered side portion of the container, again by molding the container around the extended strap connector. The advantage of these two alternatives is that the extensions of the strap connectors serve as terminals thus eliminating any subsequent construction steps needed to obtain terminals and also possibly reducing internal electrical resistance and saving materials by reducing the length of the terminals.

Figure 5:
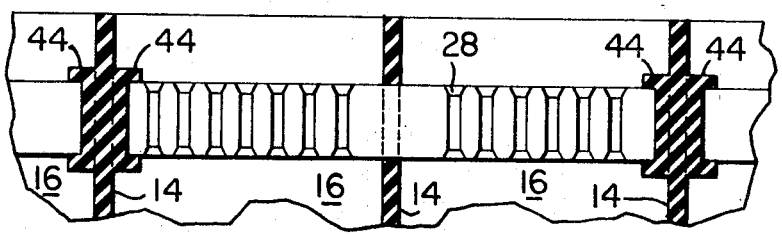
FIG. 5 is a horizontal view of part of the upper portion of the container. The figure shows one method of anchoring the ends of the intercell strap connectors by the container.

Other aspects of this invention should also be described as they relate to multicell batteries. The vibration resistance of the battery may be improved by having the container anchor the ends of each strap connector. This is particularly easy to achieve when the intercell strap connectors are molded insertions in the partitions, for the partitions may also be molded so as to anchor the ends of the intercell strap connectors, such as by the projections 44 shown in FIG. 5 or by the recessions 46 shown in FIG. 6. The end or ends of the end cell strap connectors may be similarly anchored by the container; see FIG. 7, which also shows the end cell strap connector extending to the exterior of the container to serve as a terminal.

Another feature which may easily and advantageously be employed with this invention is the use of slots in the strap connectors to receive the lugs from the electrodes. Since the lugs of the electrodes are to be inserted into the slots in a sideways direction rather than from above or below the strap connectors, it is desirable that the slots extend to the edge of the strap connector, as shown in FIG. 7.

Figure 6:
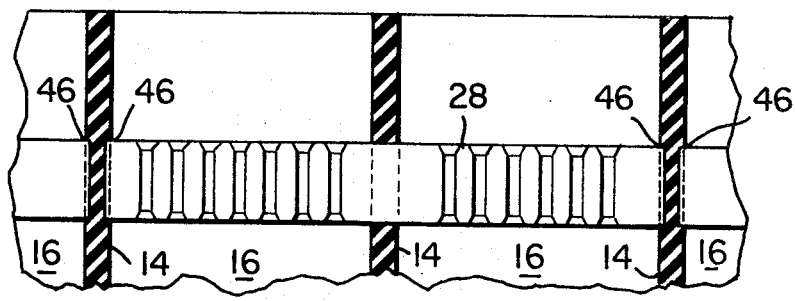
FIG. 6 is similar to FIG. 5, but shows a different method of anchoring the ends of the intercell strap connectors by the container.

Since it is common to include one more negative electrode than positive electrode in each stack, an anti-cell reversal feature may be built into the container simply by providing the exact number of slots needed in each strap. For example, a stack consisting of 7 negative electrodes and 6 positive electrodes cannot be installed backwards if each negative connecting strap has exactly 7 slots while each positive strap has exactly 6 slots. This feature is illustrated in FIG. 6. Where such straps are connected to the stacks in conventional element assembly machines, it is still possible to insert the element in a cell compartment backwards unless some other anti-reversal feature is used. Previous methods of constructing anti-cell reversal features in individual cell compartments have required additional metal in one or both of the strap connectors and/or additional container material; these extra material costs are not needed with the construction shown with this invention.

If a heat technique is used to connect the electrodes and the connecting straps, some provision may be required to prevent the molten metal from flowing errantly onto the plates and separators. If any kind of shield is placed over the top of the stack to prevent damage by heat (see the slotted heat protectors of U.S. Pat. 3,350,237 and British Pat. 988,423) or by external objects subsequently placed into the constructed battery, the shield may have an impression which serves to retain the molten metal.

For simplicity the mating surfaces of the two sides portions of the container are shown in FIG. 1 as being plane surfaces. It should be understood that other contours and possibly flanges extending externally or internally from the first and/or second side portions of the container may be preferable with certain materials and sealing techniques. Such constructions are all within the present invention.

From the discussion above, the application of this invention to single cell batteries is easy to visualize. The only strap connectors involved, of course, are not of the intercell type but are like the end cell strap connectors used in multicell batteries. The two strap connectors may optionally extend through the walls of the container to serve as external terminals. The cover may be separate from, or integrally constructed with, the two portions of the container.

The cross-referenced application listed above discloses and claims a battery in which the joint between the two portions of the container is horizontal rather than vertical so that the container is divided into an upper and a lower portion rather than into two side portions. The electrodes are placed into one portion of the container and are raised from below the strap connectors to make engagement with the strap connectors, rather than being moved sideways to make engagement with the strap connectors as with my invention.

I claim.

1. A method of constructing a multicell battery in which the container has at least one partition dividing the space inside the container into multiple cell compartments and in which the container consists of a first side portion and a second side portion, the container having an intercell strap connector extending through each partition, the method consisting of:
    (a) placing a stack including alternately spaced positive and negative electrodes in each cell compartment of one portion of the container;
    (b) sealing the portions of the container together;
    (c) connecting the positive electrodes of the stack in one cell compartment to one end of one intercell strap connector;
    (d) connecting the negative electrodes of the stack in the adjacent cell compartment to the other end of that one intercell strap connector;
    (e) repeating steps (c) and (d) above until both ends of all intercell strap connectors are connected to electrodes;
    (f) connecting the positive electrodes of the stack in one end cell compartment to an end cell strap connector in that compartment;
    (g) connecting the negative electrodes of the stack in the other end cell compartment to an end cell strap connector in that compartment;
    (h) sealing a cover onto the container;
    (i) extending a terminal from the positive end cell strap connector in one end cell compartment to the exterior of the cover; and,
    (j) extending a second terminal from the negative end cell strap connector in the other end cell compartment to the exterior of the cover.

2. A method of constructing a multicell battery in which the container has at least one partition dividing the space inside the container into multiple cell compartments and in which the container consists of a first side portion and a second side portion, the container having an intercell strap connector extending through each partition, the method consisting of:
    (a) placing a stack including alternately spaced positive and negative electrodes in each cell compartment of one portion of the container;
    (b) sealing the portions of the container together;
    (c) connecting the positive electrodes of the stack in one cell compartment to one end of one intercell strap connector;
    (d) connecting the negative electrodes of the stack in the adjacent cell compartment to the other end of that one intercell strap connector;
    (e) repeating steps (c) and (d) above until both ends of all intercell strap connectors are connected to electrodes;
    (f) connecting the positive electrodes of the stacks in one end cell compartment to an end cell strap connector in that compartment;
    (g) connecting the negative electrodes of the stack in the other end cell compartment to an end cell strap connector in that compartment;
    (h) sealing a cover onto the container;
    (i) extending a terminal from the positive end cell strap connector in one end cell compartment to the exterior of the container; and,
    (j) extending a second terminal from the negative end cell strap connector in the other end cell compartment to the exterior of the container.

3. A method of constructing a multicell battery in which the container has at least one partition dividing the space inside the container into multiple cell compartments and in which the container consists of a first side portion and a second side portion, the container having an intercell strap connector extending through each partition, a portion of the cover also being integrally constructed with each side portion of the container, the method consisting of:
    (a) placing a stack including alternately spaced positive and negative electrodes in each cell compartment of one portion of the container;
    (b) sealing the portions of the container together;

(c) connecting the positive electrodes of the stack in one cell compartment to one end of one intercell strap connector;

(d) connecting the negative electrodes of the stack in the adjacent cell compartment to the other end of that one intercell strap connector;

(e) repeating steps (c) and (d) above until both ends of all intercell strap connectors are connected to electrodes;

(f) connecting the positive electrodes of the stack in one end cell compartment to an end cell strap connector in that compartment;

(g) connecting the negative electrodes of the stack in the other end cell compartment to an end cell strap connector in that compartment;

(h) extending a terminal from the positive end cell strap connector in one end cell compartment to the exterior of the container; and, (i) extending a second terminal from the negative end cell strap connector in the other end cell compartment to the exterior of the container.

4. A method of constructing a multicell battery in which the container has at least one partition dividing the space inside the container into multiple cell compartments and in which the container consists of a first side portion and a second side portion, the container having an intercell strap connector extending through each partition and having end cell strap connectors, the end cell strap connectors extending from the end cell compartments to the exterior of the container, the method consisting of:

(a) placing a stack including alternately spaced positive and negative electrodes in each cell compartment of one portion of the container;

(b) sealing the portions of the container together;

(c) connecting the positive electrodes of the stacks in one cell compartment to one end of one intercell strap connector;

(d) connecting the negative electrodes of the stack in the adjacent cell compartment to the other end of that one intercell strap connector;

(e) repeating steps (c) and (d) above until both ends of all intercell strap connectors are connected to electrodes;

(f) connecting the positive electrodes of the stack in one end cell compartment to the end cell strap connector in that compartment;

(g) connecting the negative electrodes of the stack in the other end cell compartment to the end cell strap connector in that compartment; and (h) sealing a cover onto the container.

5. A method of constructing a multicell battery in which the container has at least one partition dividing the space inside the container into multiple cell compartments and in which the container has a first side portion and a second side portion, the container having an intercell strap connector extending through each partition and having end cell strap connectors, an end cell strap connector from each end cell compartment extending to the exterior of the container, a portion of the cover also being integrally constructed with each side portion of the container, the method consisting of:

(a) placing a stack including alternately spaced positive and negative electrodes in each cell compartment of one portion of the container;

(b) sealing the portions of the container together;

(c) connecting the positive electrodes of the stack in one cell compartment to one end of one intercell strap connector;

(d) connecting the negative electrodes of the stack in the adjacent cell compartment to the other end of that one intercell strap connector;

(e) repeating steps (c) and (d) above until both ends of all intercell strap connectors are connected to electrodes;

(f) connecting the positive electrodes of the stack in one end cell compartment to the end cell strap connector in that cell compartment; and, (g) connecting the negative electrodes of the stacks in the other end cell compartment to the end cell strap connector in that compartment.

6. A method of constructing a single cell battery in which the container consists of a first side portion and a second side portion, the container having a pair of strap connectors in its interior, the method consisting of:

(a) placing a stack including alternately spaced positive and negative electrodes in one portion of the container;

(b) sealing the portions of the container together;

(c) connecting the positive electrodes in the stack to one of the strap connectors;

(d) connecting the negative electrodes in the stack to the other strap connector;

(e) sealing a cover onto the container;

(f) extending a terminal from the positive strap connector to the exterior of the cover; and, (g) extending a second terminal from the negative strap connector to the exterior of the cover.

7. A method of constructing a single cell battery in which the container consists of a first side portion and a second side portion, the container having a pair of strap connectors in its interior, the method consisting of:

(a) placing a stack including alternately spaced positive and negative electrodes in one portion of the container;

(b) sealing the portions of the container together;

(c) connecting the positive electrodes in the stack to one of the strap connectors;

(d) connecting the negative electrodes in the stack to the other strap connector;

(e) sealing a cover onto the container;

(f) extending a terminal from the positive strap connector to the exterior of the container; and, (g) extending a second terminal from the negative strap connector to the exterior of the container.

8. A method of constructing a single cell battery in which the container consists of a first side portion and a second side portion, the container having a pair of strap connectors in its interior, a portion of the cover also being integrally constructed with each side portion of the container, consisting of:

(a) placing a stack including alternately spaced positive and negative electrodes in one portion of the container;

(b) sealing the portions of the container together;

(c) connecting the positive electrodes in the stack to one of the strap connectors;

(d) connecting the negative electrodes in the stack to the other strap connector;

(e) extending a terminal from the positive strap connector to the exterior of the container; and, (f) extending a second terminal from the negative strap connector to the exterior of the container.

9. A method of constructing a single cell battery in which the container consists of a first side portion and a second side portion, the container having a pair of strap connectors in its interior which extend through the walls of the container to serve as external terminals, the method consisting of:

(a) placing a stack including alternately spaced positive and negative electrodes in one portion of the container:

(b) sealing the portions of the container together;

(c) connecting the positive electrodes in the stack to one of the strap connectors;

(d) connecting the negative electrodes in the stack to the other strap connector; and, (e) sealing a cover onto the container.

10. A method of constructing a single cell battery in which the container consists of a first side portion and a second side portion, the container having a pair of strap connectors in its interior which extend through the walls of the container to serve as external terminals, a portion of the cover also being integrally constructed with each side portion of the container, the method consisting of:
  (a) placing a stack including alternately spaced positive and negative electrodes in one portion of the container;
  (b) sealing the portions of the container together;
  (c) connecting the positive electrodes in the stack to one of the strap connectors; and,
  (d) connecting the negative electrodes in the stack to the other strap connector.

References Cited
UNITED STATES PATENTS

| | | | |
|---|---|---|---|
| 1,425,924 | 8/1922 | Willard | 136—166 XR |
| 3,253,962 | 5/1966 | Deprill et al. | 136—166 XR |
| 3,364,076 | 1/1968 | Buttke et al. | 136—166 XR |
| 3,369,973 | 2/1968 | Himy | 136—166 XR |
| 3,390,017 | 6/1968 | Hennigan | 136—166 |
| 3,424,623 | 1/1969 | Oakey et al. | 136—176 |

WINSTON A. DOUGLAS, Primary Examiner

D. L. WALTON, Assistant Examiner

U.S. Cl. X.R.
136—134, 166